Jan. 26, 1937.  W. M. MILLER  2,069,043
POPPET VALVE CLEARANCE INDICATING CALIPER
Filed Sept. 9, 1935
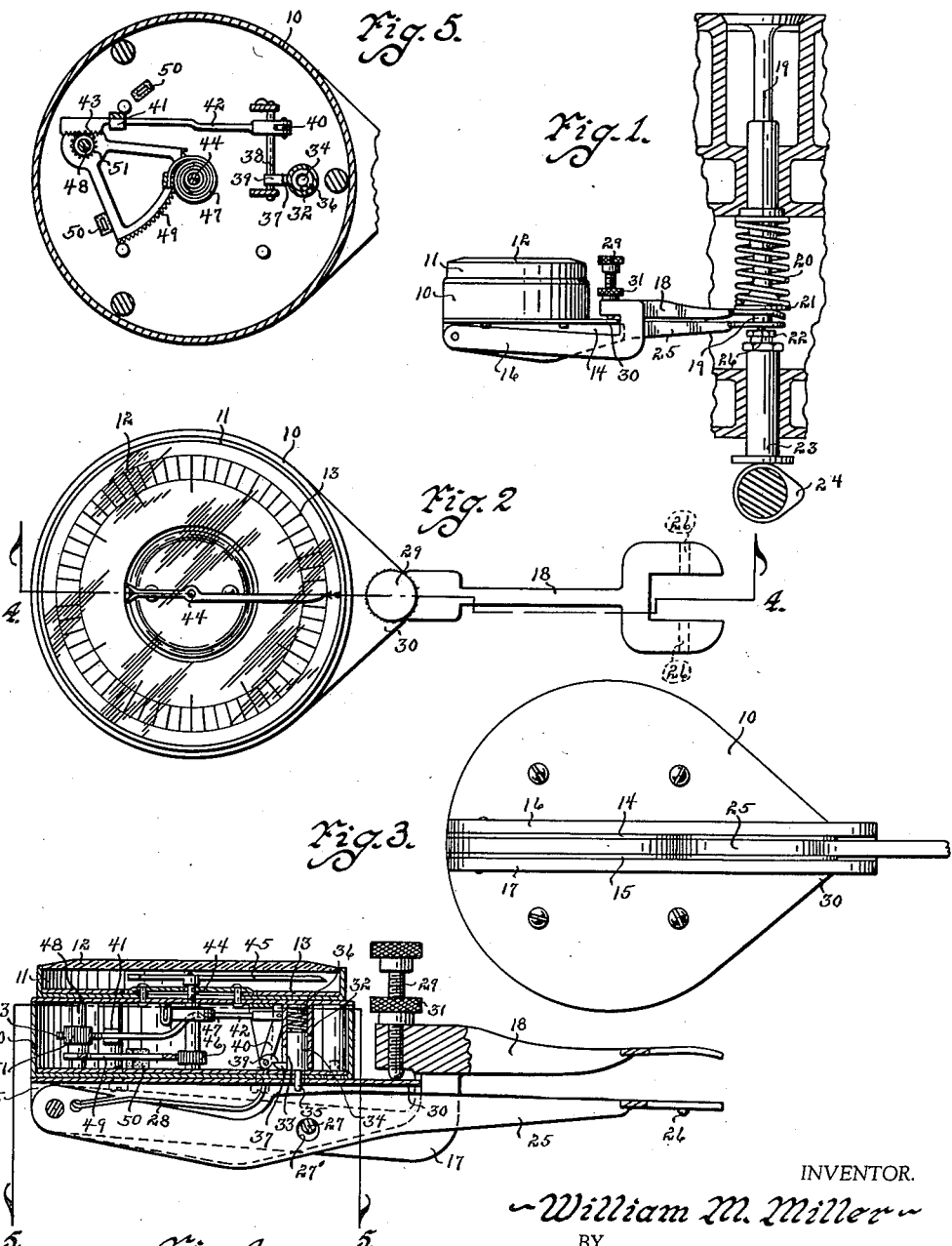
INVENTOR.
William M. Miller
BY
M. Talbert Dick
ATTORNEY.

Patented Jan. 26, 1937

2,069,043

UNITED STATES PATENT OFFICE 2,069,043

POPPET VALVE CLEARANCE INDICATING CALIPER

William M. Miller, Perry, Iowa

Application September 9, 1935, Serial No. 39,705

4 Claims. (Cl. 33—148)

The principal object of my invention is to provide an instrument of high accuracy for registering the clearance or space between the valve stem and tappet head of an internal combustion motor.

A further object of this invention is to provide an indicating caliper for registering the clearance of poppet valves that is easily operated and can be quickly adjusted for use on different valves.

A still further object of my invention is to provide a poppet valve clearance testing device that will give accurate readings regardless of the type or wear condition of the valves.

A still further object of this invention is to provide a poppet valve clearance indicating caliper that is compact, durable in use, and economical in manufacture.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

Fig. 1 is a side view of my device in actual use, registering the clearance between the valve stem and a tappet head of an internal combustion motor or like.

Fig. 2 is a top plan view of my instrument.

Fig. 3 is a bottom view of the body portion of my device with the ends of the caliper arms broken away.

Fig. 4 is a longitudinal cross-sectional view of the instrument taken on line 4—4 of Fig. 2 and more fully illustrating its interior construction.

Fig. 5 is a horizontal top plan-sectional view of my device taken on line 5—5 of Fig. 4.

Although my instrument may be used for showing distances between various movable parts, it is particularly designed for use in registering the clearance space between motor valves and their tappet heads. As is well known, no internal combustion motor can function efficiently without uniform and accurate adjustment of its valves and tappets, which are usually reciprocated by a cam mechanism. Due to the very fine and accurate clearance adjustment necessary between the valve stem and tappet head, the proper adjustment of a motor is indeed very difficult. Seldom, if ever, is it possible to get all of the poppet valves of a motor accurately adjusted from a standpoint of clearance relative to the tappet heads.

Usually, mechanics attempt to adjust the clearance of poppet valves by the use of various thicknesses of sheet metal gauges, which are inserted between the valve stem and the tappet head and then the tappet head adjusted so that the clearance will be substantially that of the thickness of the metal gauge used. Obviously, such a method is not accurate and if the tappet head is irregular, worn, or concaved by wear from the valve head, this method is not accurate and is of no value whatsoever. I have overcome all such objections by providing an instrument that will definitely give an accurate reading of the actual clearance between a valve stem and a tappet head.

Referring to the drawing, I have used the numeral 10 to designate the body housing of my device, on the top of which is a dial housing 11 having a transparent top 12. Inside the dial housing 11 is a dial plate 13. On the bottom of the body housing 10 are two spaced apart bearing flanges 14 and 15, as shown in Fig. 3. The numerals 16 and 17 designate two bar elements loosely resting at the outsides of the two bearing flanges 14 and 15, respectively. The rear ends of these two bar elements are pivoted to the bearing flanges 14 and 15 and their forward end portions are bent upwardly to be joined together and formed to and with the upper caliper arm 18, as shown in the drawing. By this construction the upper caliper arm 18 is operatively pivotally secured to the housing 10. The free end of the upper caliper arm is flattened and bifurcated in order to pass below the valve spring retainer and around each side of the valve stem extending below the retainer. This position is shown in Fig. 1 of the drawing and I have used the numeral 19 to designate the valve stem, the numeral 20 to designate the valve spring, and the numeral 21 to designate the valve spring retainer.

The numeral 22 designates the tappet head of the push rod 23, which is reciprocated by the usual cam 24 of the motor. The numeral 25 designates the lower caliper arm loosely resting between the bearing flanges 14 and 15 and having its rear end pivoted to these flanges in the same manner as that of the upper caliper arm. The forward end of this lower caliper arm 25 is also flattened and bifurcated and is a substantial duplicate of the forward end portion of the arm 18 except that it has transverse contact ridges 26 on its bottom designed to engage the top of the tappet head when the instrument is used for registering clearances. It will also be noted that the forward end portion of the arm 25 extends in a straight horizontal plane, while the forward end portion of the arm 18 is slightly bent downwardly at its extreme outer points to aid in the guiding of these two arms between the valve spring retainer 21 and the tappet head 22, as shown in Fig. 1. By this construction the lower caliper arm 25 will be operatively pivoted to the housing 10, but its extreme upward movement is limited by engagement with the bottom of the housing and its downward movement relative to the housing 10 is limited by a pin 27 which is rigidly secured to the bearing flanges 14 and 15 and passes through an enlarged hole 27' in the arm 25, as shown in Fig. 4. The numeral 28 designates a spring between the bearing flanges 14 and 15 which engages the bottom of the housing 10 and the upper portion of the lower caliper arm 25 for yieldingly holding the arm the limit of distance away from the housing 10. The upward swinging movement of the upper caliper arm 18 is limited by engagement with the bottom of the housing 10 and its swinging movement downwardly and away from the housing 10 is adjustably limited by a thumb screw 29 threaded through it and engaging the top of a projection 30 of the housing 10.

The numeral 31 designates a lock nut threaded on the thumb screw 29. The numeral 32 designates a vertical cylinder inside the housing 10 having a slot 33 in its side. The numeral 34 designates a piston slidably mounted in the cylinder 32 having a pin 35 extending downwardly through the housing 10 and capable of being engaged by the upper edge of the lower caliper arm 25. The numeral 36 designates a coil spring inside the cylinder 32 having one end engaging the top of the housing 10 and its lower end engaging the top of the piston 34 for yieldingly holding the piston 34 in a downward position. The numeral 37 designates a finger secured to the piston 34 and extending from the cylinder 32 through the opening 33. The numeral 38 designates a shaft rotatably mounted inside the housing 10 and having a lug 39 in engagement with the finger 37. The numeral 40 designates an arm having one end rigidly secured to the shaft 38. This shaft 38, lug 39, and arm 40 have the function of a crank arm assembly. The numeral 41 designates a bearing member inside the housing 10. The numeral 42 designates a bar horizontally slidably mounted in the bearing member 41 and having one end hingedly secured to the free end of the arm 40. The numeral 43 designates a toothed rack portion on the other end of the arm 42. The numeral 44 designates a vertical shaft rotatably mounted in the housing 10 and extending through the center top of the housing 10 to enter the dial housing 11. The numeral 45 designates a pointing needle rigidly secured to the top of the shaft 44, inside the dial housing, and capable of reading on the dial plate 13. The numeral 46 designates a spur gear on the shaft 44 and inside the housing 10. The numeral 47 designates a coil spring embracing the shaft 44, having one end secured to the shaft 44 and its other end operatively secured to the housing 10 for yieldingly holding the shaft 44 in a rotation to the left.

The numeral 48 designates a vertical shaft rotatably mounted inside the housing 10 and having a gear segment 49 in operative engagement with the spur gear 46 on the shaft 44. The numeral 50 designates two stops inside the housing 10 for engaging and limiting the movement of the gear segment 49 to two directions. The numeral 51 designates a spur gear rigidly secured on the shaft 48 and in engagement with the toothed rack 43.

The practical operation of my device is as follows: The two forked ends of the instrument are placed between the valve spring retainer 21 and the tappet head 22, as shown in Fig. 1. The forked end of the upper caliper arm 18 will extend around the valve stem 19 that extends below the valve spring retainer and the contact ridges 26 of the lower caliper arm that engage the top of the tappet head. This operation is accomplished when the push rod is at its extreme lowered position, as shown in Fig. 1, and a maximum space exists between the bottom of the valve stem and the tappet head. The spring 28 will spread the lower caliper arm downwardly and away from the upper caliper arm, insuring that the upper caliper arm will snugly engage the bottom of the spring retainer, and the contact ridges 26 will snugly engage the top of the tappet head. It will here be noted, however, that the lower contact arm 25 has a certain amount of swinging movement before engagement with the pin 35 and that if the instrument is not between two members to be engaged, the rotation of the thumb screw 29 will have no effect on the operation of the pointing needle 45. In other words, the upper caliper arm may be moved upwardly or downwardly relative to the housing 10 without in any way affecting the dial reading and the lower caliper arm may be moved upwardly or downwardly within certain limits relative to the upper caliper arm without affecting the dial reading. However, after the caliper arm 25 has engaged the pin 35, any further movement of this arm 25 toward the arm 18 will affect the dial reading.

With the instrument in proper position as above described, the thumb screw 29 is rotated to bring the needle 45 to any desired starting point. Obviously, the rotation of the thumb screw 29 will affect the dial reading when the two caliper arms 18 and 25 are held from spreading by members such as a spring retainer and tappet head as the rotation of this screw will bring, by engagement with the member 30, the housing carrying the pin 35 toward or away from engagement with the caliper arm 25. Therefore, the member 29 should be rotated to a position where the needle will be at zero marking on the dial plate such as shown in Fig. 2, although this zero reading or marking on the dial may be any place on the circumference of the dial. With the needle 45 reading on zero or such other point on the dial as desired, the push rod is raised until the tappet head is in normal contact with the bottom of the valve stem and the clearance between these two members has been eliminated. This upward movement of the tappet head brings the caliper arm 25 into contact with the pin 35 and the pin 35 will be raised relative to the distance the tappet head had to travel upwardly to engage the valve stem. Any upward movement of the pin 35 accordingly rotates the needle 45, which registers on the dial plate and gives a definite and correct reading of the clearance of the poppet valve regardless of its type or condition of wear. The dial may be marked with suitable lines or character strokes designating thousandths of an inch, or any other markings designating the measurement of distances. Obviously, my instrument may be used in other and various manners. For example, the tappet head may be lifted to engagement with the valve stem and the screw 29 rotated to give say a zero reading and then the tappet head lowered and adjusted to give the desired reading on the dial of the clearance required. The free end of the caliper arm 25 is bifurcated in order that the lower end portion of the valve stem may be between it when the tappet head is raised to meet the valve stem.

The operation of the mechanism inside the housing is obvious. When the pin 35 is raised, the piston 34 will also be raised against the action of the spring 36 and the finger 37 will engage the lug 39, thereby rotating the shaft 38 and moving the arm 40 toward the bearing member 41. This moves the arm 42 toward the bearing member 41 and as the toothed rack 43 of this arm is in engagement with the gear 51 the shaft 48 will be rotated, which will move the gear segment 49 to the left and rotate the shaft 44 carrying the needle 45 to the right as the gear segment 49 is in engagement with the gear 46 on the shaft 44. The movement of the shaft 44 and needle 45 will be against the yielding action of the coil spring 47 and therefore as the pin 35 moves downwardly with the downward movement of the arm 25 this spring 47 will rotate the needle 45 to the left. To aid in the accurate reading of the instrument, the left or reading edge of the needle 45 is straight and rests in a plane with the center of the shaft 44, as shown in Fig. 2. In many instances, it will be desirable to lock the thumb screw 29 against accidental rotation after having once been set and this may be accomplished by the lock nut 31.

Some changes may be made in the construction and arrangement of my improved poppet valve clearance indicating caliper without departing from the real spirit and purpose of my invention, and it is my intention to cover by my claims any modified forms of structure or use of mechanical equivalents which may be reasonably included within their scope.

I claim:

1. In a distance measuring device, a base portion, a caliper arm hingedly secured to said base portion, a manually operated means for adjustably limiting the swinging action of said caliper arm in one direction relative to said base portion, a second caliper arm hingedly secured to said base portion, a means for yieldingly holding said second caliper arm away from said base portion, a stop means for limiting the swinging action of said second caliper arm away from said base portion, a movable member on said base portion capable of being engaged by said second caliper arm after said second caliper arm has been moved a distance from said stop means, a means for yieldingly holding said movable member toward said second caliper arm, and a gauge mechanism operatively connected to said movable member.

2. In a distance measuring device, a base portion, a caliper arm hingedly secured to said base portion, a manually operated means for adjustably limiting the swinging action of said caliper arm in one direction relative to said base portion, a second caliper arm hingedly secured to said base portion, a means for yieldingly holding said second caliper arm away from said base portion, a stop means for limiting the swinging action of said second caliper arm away from said base portion, a movable member on said base portion capable of being engaged by said second caliper arm after said second caliper arm has been moved a distance from said stop means, a means for yieldingly holding said movable member toward said second caliper arm, a gauge mechanism operatively connected to said movable member, and a bifurcated end portion on the free end of each of said caliper arms.

3. In a distance measuring device, a base portion, a caliper arm hingedly secured to said base portion, a manually operated means for adjustably limiting the swinging action of said caliper arm in one direction relative to said base portion, a second caliper arm hingedly secured to said base portion, a means for yieldingly holding said second caliper arm away from said base portion, a stop means for limiting the swinging action of said second caliper arm away from said base portion, a movable member on said base portion capable of being engaged by said second caliper arm after said second caliper arm has been moved a distance from said stop means, a means for yieldingly holding said movable member toward said second caliper arm, a gauge mechanism operatively connected to said movable member, a bifurcated end portion on the free end of each of said caliper arms, and a rigid member formed on a bifurcated end portion of one of said caliper arms.

4. In a poppet valve clearance indicating caliper, a base portion, a caliper arm hingedly secured to said base portion, a manually operated means for adjustably limiting the swinging action of the said caliper arm away from said base portion, a second caliper arm hingedly secured to said base portion, a means for yieldingly holding said second caliper arm away from said base portion, a stop means for limiting the swinging action of said second caliper arm away from said base portion, a gauge mechanism rigidly secured to said base portion and having a movable member capable of being contacted by said second arm.

WILLIAM M. MILLER.